(12) United States Patent
Kirkpatrick et al.

(10) Patent No.: US 6,732,359 B1
(45) Date of Patent: May 4, 2004

(54) APPLICATION PROCESS MONITOR

(75) Inventors: Mark Kirkpatrick, Conyers, GA (US);
Darin J. Morrow, Acworth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/468,446

(22) Filed: Dec. 21, 1999

(51) Int. Cl.[7] .................................................. G06F 9/00

(52) U.S. Cl. ........................ 718/102; 718/104; 718/107

(58) Field of Search ................................. 709/104, 107, 709/100, 101, 102, 103; 717/27, 127; 718/100, 101, 102, 103, 104, 105, 106, 107

(56) References Cited

U.S. PATENT DOCUMENTS

| 5,715,389 A | * | 2/1998 | Komori ........................ 714/47 |
| 5,748,468 A | * | 5/1998 | Notenboom et al. ........... 700/3 |
| 5,835,765 A | * | 11/1998 | Matsumoto ................. 709/102 |

* cited by examiner

*Primary Examiner*—Majid A. Banankhah
(74) *Attorney, Agent, or Firm*—Woodcock Washburn LLP

(57) ABSTRACT

A computer system has a memory, an operating system, and a computer application instantiated in a work space in the memory as managed by the operating system. The application includes a plurality of application processes running in the work space. An application monitor monitors whether each of the plurality of application processes is in fact running, and automatically attempts to remedy an occurrence where any of the plurality of application processes is not in fact running.

59 Claims, 2 Drawing Sheets

APPLICATION PROCESS MONITOR

FIELD OF THE INVENTION

The present invention relates to a method and apparatus for monitoring an application process. In particular, the present invention relates to monitoring the constituent components of an application and responding to failures in the operation thereof.

BACKGROUND OF THE INVENTION

Typically, a computer system/computer has an operating system, and a computer application is instantiated on the computer in the form of one or more application processes running in a work space managed by the operating system. This is especially true with regards to large and/or complex applications, such as an application for managing one or more aspects of a factory, for controlling environmental conditions in a large building, for controlling power generation in a power facility, etc.

For any of a variety of reasons, an application process can fail. For example, an application process can fail if a needed resource is not available, if an expected piece of information is missing, or if an impermissible operation is performed, among other things. While such a failure does not necessarily cause the entire application to fail immediately, such failure of such entire application is likely to be inevitable.

As should be evident, failure of an entire application can be annoying to a system operator to say the least, and can cause critical and even fatal damage to say the most. In the most benign situation, a computer operator must somehow be informed that the application has failed and then must re-start the application on the computer. Of course, if the operator must be summoned at an inopportune hour, and/or if the operator must travel a relatively long distance to an appropriate location to command the re-start, even the most benign situation can become very costly and/or highly troublesome. In the most ominous situation, the failure of the application can lead to loss of life, if for example the application controls medical equipment in a hospital; loss of property, if for example the application controls environmental equipment in a sensitive location; and/or other dangerous situations.

Accordingly, a need exists for a method and apparatus for monitoring the application processes that comprise an application running on an operating system, and for automatically attempting to address the failure of an application process before such failure causes the failure of the entire application.

SUMMARY OF THE INVENTION

In the present invention, a computer system has a memory, an operating system, and a computer application instantiated in a work space in the memory as managed by the operating system. The application includes a plurality of application processes running in the work space. An application monitor monitors whether each of the plurality of application processes is in fact running, and automatically attempts to remedy an occurrence where any of the plurality of application processes is not in fact running.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
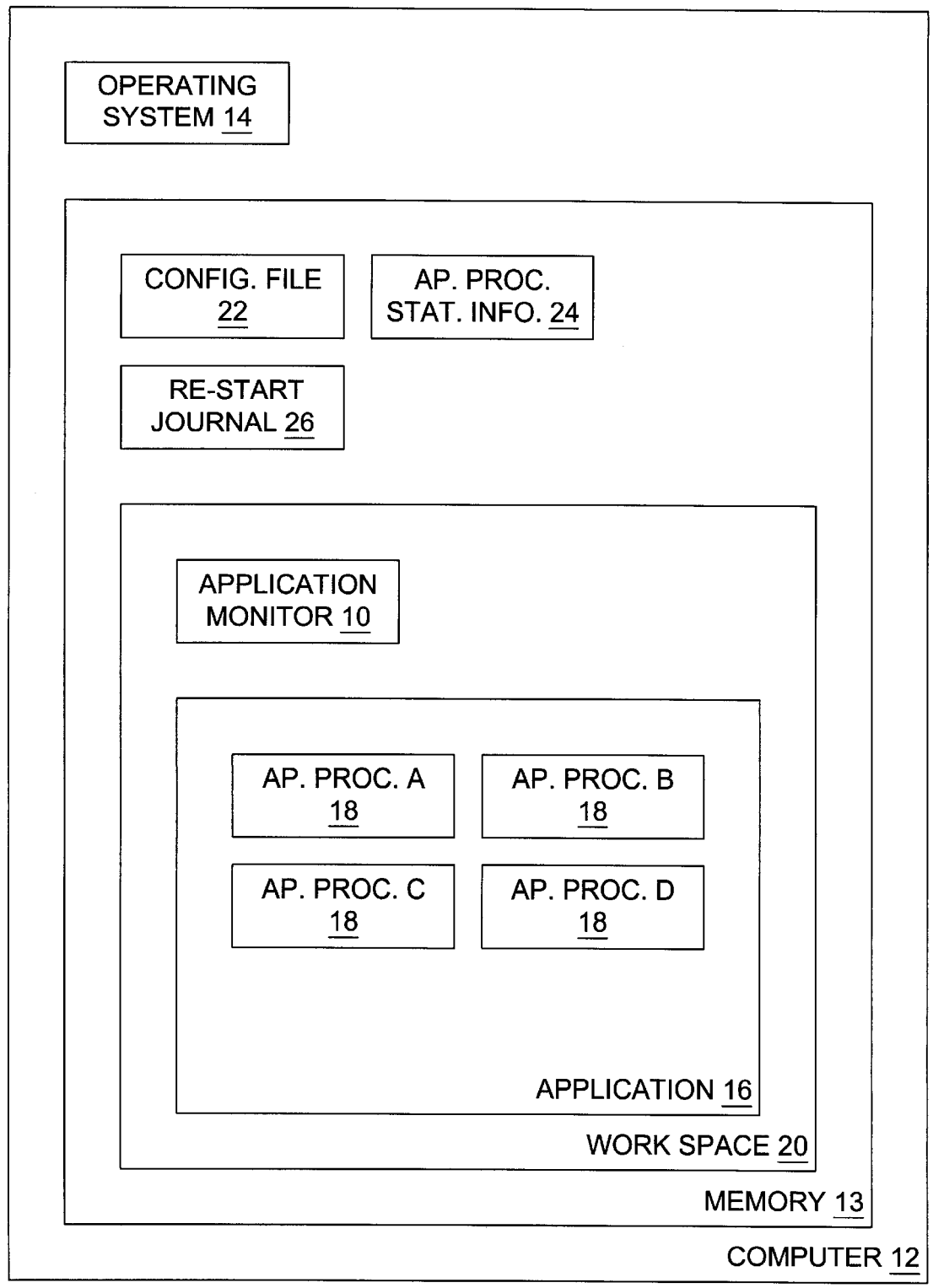
FIG. 1 is a block diagram showing an application monitor operating in conjunction with a plurality of application processes constituting an application on a computer in accordance with one embodiment of the present invention.

Referring now to FIG. 1, an application monitor 10 is shown in accordance with one embodiment of the present invention. As seen, the application monitor 10 runs on a computer system/computer 12 or the like, and therefore may be embodied in the form of appropriate computer software. Of course, the application monitor 10 may also be embodied in the form of appropriate hardware or a combination of appropriate hardware and software without departing from the spirit and scope of the present invention.

As was discussed above, the computer 12 typically has a memory 13 and an operating system 14, and a computer application 16 is instantiated on the computer 12 in the form of one or more application processes 18 running in a work space 20 in the memory 13 as managed by the operating system 14 and set aside specifically for the application 16. Notably, any appropriate computer 12, operating system 14, and application 16 may be employed without departing from the spirit and scope of the present invention. For example, the computer 12 may be a mainframe computer, a minicomputer, a desktop- or laptop-based personal computer, or the like; the operating system may be a LINUX-based operating system, a WINDOWS-based operating system, a UNIX-based operating system, or some other operating system; and the application may be a banking system an environmental control system, a physical plant control system, a factory operation system, a medical facility operation system, or another application.

As shown, the operating system 14 may be operating separately from the memory 13, or may be operated in the memory 13. Such memory 13 may be any type of computer memory, such as RAM, ROM, a hard disk drive, a removable disk drive, a CD-ROM drive, or combinations thereof, without departing from the spirit and scope of the present invention.

Typically, when an operator commands the operating system 14 of a computer 12 to instantiate an application 16, such operating system 14 performs a number of procedures. In one of such procedures, the operating system 14 locates a configuration file 22 for the application 16 in the memory 13, and then processes the located configuration file 22. In particular, the configuration file includes a list of the application processes 18 that are to be run as part of instantiating the application 16. For example, the configuration file 22 for a particular application 16 may include the following commands:

. . .

RUN APPLICATION PROCESS A
RUN APPLICATION PROCESS B

RUN APPLICATION PROCESS C
RUN APPLICATION PROCESS D
. . .

As should be apparent from FIG. 1, the processing of the aforementioned configuration file 22 creates such application processes A–D in the work space 20 set aside for the application 16 by the operating system 14 of the computer 12. Of course, any particular configuration file 22 may be employed without departing from the spirit and scope of the present invention, and such configuration file 22 may contain other commands, again without departing from the spirit and scope of the present invention.

Depending on the application 16, the constituent application processes 18 thereof may work independently of each other. That is, the operation of each application process 18 does not affect the operation of any other application process 18. More likely, though, at least some of the constituent application processes 18 of the application 16 are dependent on other application processes 18. That is, for at least some of the application processes 18, the operation of each such application process 18 relies at least in part on the operation of at least one other application process 18. Accordingly, if a first application process 18 fails and therefore does not perform a particular function, a second application process that is depending on the first application process 18 to perform the particular function will likely in turn fail. Since a third application process 18 may be dependent on the second application process 18, a fourth application process 18 may be dependent on the third application process 18, etc., such third, fourth, and further application processes will likely eventually fail, too, until the underlying application 16 collapses and grinds to a halt. As may be appreciated, such a cascade of failures can occur over a relatively short period (a millisecond, for example) or a relatively long period (days, for example).

Figure 2:
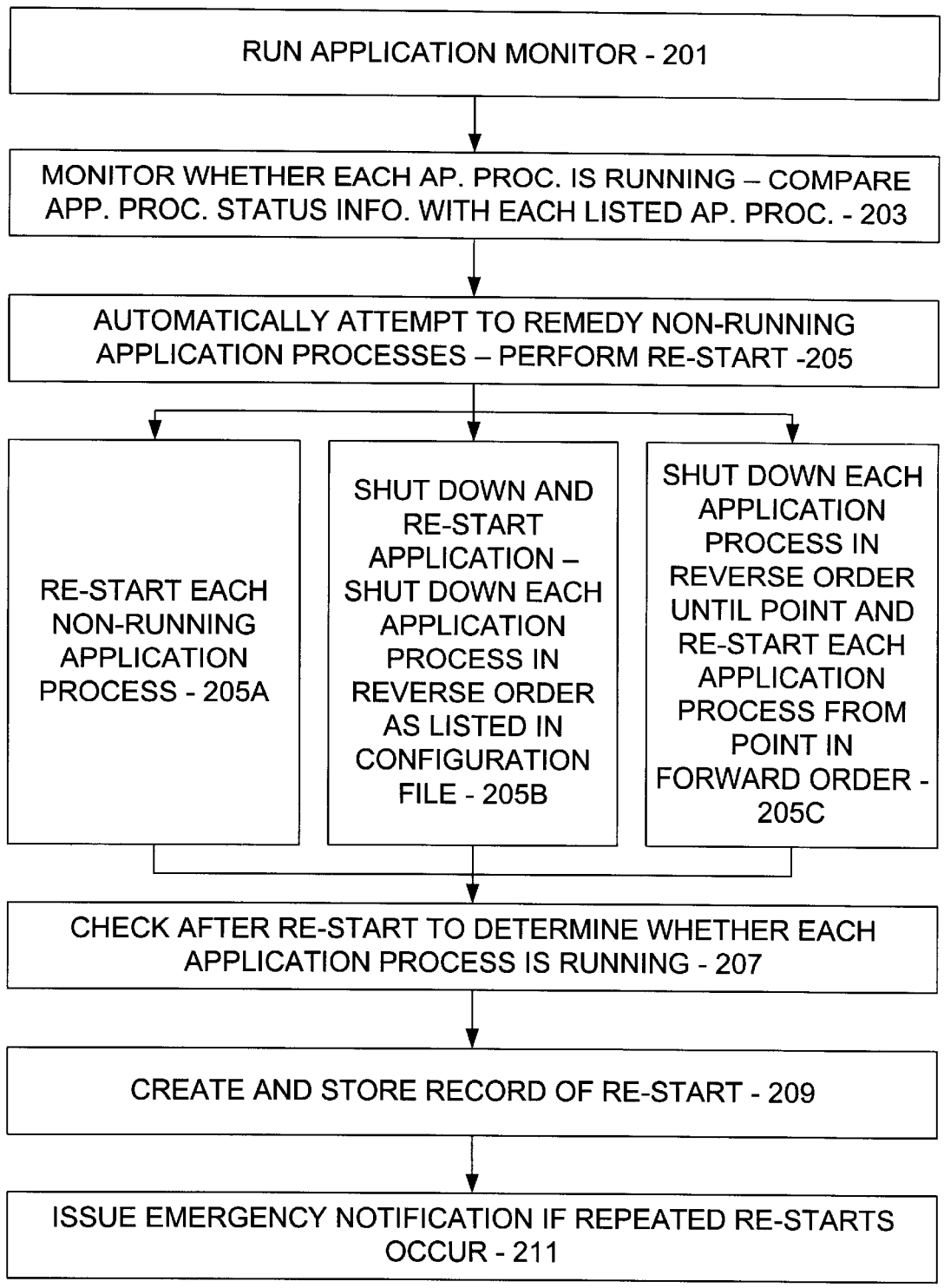
FIG. 2 is a flow chart depicting steps employed by the application monitor of FIG. 1 in accordance with one embodiment of the present invention.

In one embodiment of the present invention, in addition to running each application process 18 as specified in the configuration file 22 to create such application process 18 in the work space 20 of the application 16, the operating system 14 of the computer 12 also runs the aforementioned application monitor 10 to create such application monitor 10 (step 201, FIG. 2). As should be understood, the application monitor 10 is for monitoring the application 16, and in particular is for monitoring whether each constituent application process 18 is running (step 203, FIG. 2).

As shown, the application monitor 10 for the application 16 may be created by the operating system 14 in the work space 20 of the application 16. However, such application monitor 10 may also be created elsewhere without departing from the spirit and scope of the present invention. Further, the running of the application monitor 10 may take place in the course of processing the configuration file 22, or may take place separately. If separately, an application script or the like associated with the application 16 may include commands such as:

. . .

RUN CONFIGURATION FILE
RUN APPLICATION MONITOR

Such application script thus causes the operating system 14 to locate and process the configuration file 22 and also to locate and run the application monitor 10.

In one embodiment of the present application, the application monitor 10 periodically checks with the operating system 14 to determine whether each application process 18 is still running. The actual frequency of the checks may of course vary without departing from the spirit and scope of the present invention, and may be a function of such factors as the degree of reliability of the application 16, the criticality of the application 16, system resources available, the mean time for a failure of an application process 18 to cause a failure of the entire application 16, and the like.

In operation, the application monitor 10 is aware of each application process 18 listed in the configuration file 22 for the application 16, and refers to application process status information 24 maintained by the operating system 14 in the memory 13 (and perhaps even in the work space 20) to ascertain whether each such application process 18 is still running. The application monitor 10 may be made aware of each application process 18 listed in the configuration file 22 in any of several ways without departing from the spirit and scope of the present application. For example, the application monitor 10 may be specifically programmed with the name of each such application process 18, or may be provided with the capability to read the name of each application process from the configuration file 22, among other things.

The application process status information 24 maintained by the operating system 14 includes the name of each application process 18 currently running or the equivalent, and perhaps further information as to the status of each such application process 18 (i.e., 'running', 'standby', etc.). Such information 24 is likely organized in a table and stored by the operating system 14 in an appropriate location such as the memory 13, as shown. If an application process 18 has failed, it may be listed in the information 24 as such, or as some variation thereof ('failed', 'not responding', e.g.). Alternatively, such a failed application process 18 may not be listed in the information 24 at all. Thus, to ascertain whether each application process 18 of the application 16 is still running, the application monitor 10 in essence checks that each application process 18 as listed in the configuration file 22 for the application 16 is also listed in the application process status information 24 as running or the equivalent (i.e., 'running', 'standby', etc., and not 'failed', 'not responding', etc.) (step 203, FIG. 2).

If each such application process 18 of the application 16 is in fact still running or the equivalent, the application monitor 10 need take no action except to remind itself to perform another check after the specified period has passed. However, if one or more of the application processes 18 of the application 16 have stopped, either due to failure or otherwise, the application monitor 10 attempts to address and remedy the situation, as will be explained in more detail as follows (step 205, FIG. 2).

In one embodiment of the present invention, addressing and remedying the situation involves the application monitor 10 executing a command in cooperation with the operating system 14 to re-start each failed application process 18 (step 205A, FIG. 2). Notably, though, application processes 18 often must be started in a particular sequence, such as that specified in the configuration file 22, owing to their dependent nature. Accordingly, re-starting a particular application process 18 out of sequence may not be successful, and in fact could cause other application processes to fail. Accordingly, such re-starting of a particular application process 18 is preferably immediately followed by the application monitor 10 re-checking with the operating system 14 to determine whether each application process 18 is still running (step 207, FIG. 2).

In one embodiment of the present invention, if the aforementioned re-start of particular application processes 18 is unsuccessful, or as an alternative thereto, addressing and remedying the situation involves the application monitor 10 causing the application 16 to shut down by causing each application process 18 thereof to shut down, and then causing the application to re-start in the normal manner, i.e., according to a command to the operating system 14 of the computer 12 to again instantiate the application 16 (step 205B, FIG. 2). Accordingly, such operating system 14 would then perform normal start-up procedures for the application, including locating and processing the configuration file 22 for the application 16, and if necessary or desirable again running the application monitor 10.

Such shut-down may be as simple as immediately killing all of the application processes 18 of the application 16 in no particular order or sequence and without any attempt to save any data. However, such a 'kill' shut-down may be quite radical and needlessly harsh in most circumstances. In one embodiment of the present invention, the shut-down is controlled as much as possible and is done in an orderly manner in an attempt to save as much data as possible. Accordingly, such a 'controlled' shut-down is in a manner similar to if not identical with a normal shut-down of the application 16, excepting of course the fact that one or more constituent application processes 18 are already de facto shut down. Such controlled shut-down may be directed by the application 16 itself or by the application monitor 10 if the application 16 is unable or willing to shut itself down. Accordingly, in such a situation, the application monitor 10 includes appropriate controlled shut-down procedures and is capable of executing such procedures in cooperation with the operating system 14.

Such shut-down procedures may comprise shutting down each application process in the reverse order/sequence as listed in the configuration file 22 (i.e., Application Process D, Application Process C, Application Process B, etc.). In such a situation, it is preferable that the application monitor 10 not be run in the course of processing the configuration file 22. Otherwise, the application monitor 10 could shut itself down prematurely. Once the application 16 is fully shut down, the application monitor 10, which should still be running, then can execute an appropriate start-up command in cooperation with the operating system 14. The application monitor 10 may then shut itself down in anticipation of being re-started by the operating system 14 in the course of re-starting the application 16, or may leave itself running.

In one embodiment of the present invention, if the aforementioned re-start of particular application processes 18 is unsuccessful, or as an alternative thereto, addressing and remedying the situation involves the application monitor 10 executing a command in cooperation with the operating system 14 to partially shut down the application 16 to the point of the failed application process 18, and then re-starting from such point (step 205C, FIG. 2). That is, remembering that the application processes 18 were started in a particular order/sequence as specified in the configuration file 22 (i.e., Application Process A, Application Process B, Application Process C, etc.), such application processes 18 are shut down in the reverse order/sequence (i.e., Application Process D, Application Process C, Application Process B, etc.) until the point where all of the failed application processes 18 would have been shut down. Thereafter, the application monitor 10 causes the application 16 to re-start from that point according to the particular order/sequence as specified in the configuration file 22.

Owing to the fact that such a 'partial' shut-down and re-start may not be successful for any of a variety of reasons, such partial re-start of the application 16 is preferably immediately followed by the application monitor 10 re-checking with the operating system 14 to determine whether each application process 18 is still running. If in fact the partial re-start was unsuccessful, a controlled shut-down and re-start should be performed (step 207, FIG. 2).

In one embodiment of the present invention, a record of each re-start/shut-down, including all appropriate information, is created and stored in a re-start/shut-down journal 26 located in the memory 13 of the computer 12 or elsewhere (step 209, FIG. 2). Thus, an operator and/or programmer may review the journal 26 to diagnose the cause of any repeated application shut-downs. If a repeated shut-downs occur, or if re-starts are repeatedly unsuccessful, the application monitor 10 may cause an emergency notification or the like to be issued to appropriate personnel by way of an electronic mail message, an electronic telephone message, a telephone call to a beeper number, a radio message, a warning buzzer, etc. (step 211, FIG. 2).

The programming necessary to effectuate the present invention, such as the programming run by the application monitor 10, the operating system 14, and the application 16 and application processes 18 thereof, is known or is readily apparent to the relevant public. Accordingly, further details as to the specifics of such programming are not believed to be necessary herein.

As should now be understood, in the present invention, a method and apparatus are provided to monitor the application processes 18 that comprise an application 16 running on an operating system 14 of a computer 12, and for automatically attempting to address the failure of an application process 18 before such failure causes the failure of the entire application 16. Changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A computer system having a memory, an operating system, a computer application instantiated in a work space in the memory as managed by the operating system, the application including a plurality of application processes running in the work space, and an application monitor monitoring whether each of the plurality of application processes is in fact running and automatically attempting to remedy an occurrence where any of the plurality of application processes is not in fact running.

2. The computer system of claim 1 wherein the application monitor is created by the operating system in the work space of the application.

3. The computer system of claim 1 wherein the operating system instantiates the application by processing a configuration file which includes a sequential list of the plurality of application processes to be run, and wherein the application monitor is run separately from the processing of the configuration file.

4. The computer system of claim 1 wherein the application monitor periodically checks with the operating system to determine whether each of the plurality of application processes is in fact running.

5. The computer system of claim 1 wherein if the application monitor finds that any of the plurality of application processes is not in fact running, such application monitor re-start each non-running application process.

6. The computer system of claim 5 wherein the re-start is followed by the application monitor checking to determine whether each application process is in fact running.

7. The computer system of claim 5 wherein the application monitor creates and stores a record of the re-start.

8. The computer system of claim 5 wherein the application monitor issues an emergency notification if repeated re-starts occur.

9. The computer system of claim 8 wherein the application monitor issues the emergency notification by way of a member of a group consisting of an electronic mail message, an electronic telephone message, a telephone call to a beeper number, a radio message, and a warning buzzer.

10. The computer system of claim 1 wherein if the application monitor finds that any of the plurality of application processes is not in fact running, such application monitor shuts down and re-starts the application.

11. The computer system of claim 10 wherein the re-start is followed by the application monitor checking to determine whether each application process is in fact running.

12. The computer system of claim 10 wherein the operating system instantiates the application by processing a configuration file which includes an ordered list of the plurality of application processes to be run, and wherein the shut down comprises shutting down each of the plurality of application processes in a reverse order as listed in the configuration file.

13. The computer system of claim 10 wherein the application monitor creates and stores a record of the re-start.

14. The computer system of claim 10 wherein the application monitor issues an emergency notification if repeated re-starts occur.

15. The computer system of claim 14 wherein the application monitor issues the emergency notification by way of a member of a group consisting of an electronic mail message, an electronic telephone message, a telephone call to a beeper number, a radio message, and a warning buzzer.

16. The computer system of claim 1 wherein the operating system instantiates the application by processing a configuration file which includes an ordered list of the plurality of application processes to be run, and wherein if the application monitor finds that any of the plurality of application processes is not in fact running, such application monitor shuts down each of the plurality of application processes in a reverse order as listed in the configuration file until a point where all of the non-running application processes would have been shut down, and then re-starts each of the plurality of application processes from the point in a forward order as listed in the configuration file.

17. The computer system of claim 16 wherein the re-start is followed by the application monitor checking to determine whether each application process is in fact running.

18. The computer system of claim 16 wherein the application monitor creates and stores a record of the re-start.

19. The computer system of claim 16 wherein the application monitor issues an emergency notification if repeated re-starts occur.

20. The computer system of claim 19 wherein the application monitor issues the emergency notification by way of a member of a group consisting of an electronic mail message, an electronic telephone message, a telephone call to a beeper number, a radio message, and a warning buzzer.

21. An application monitor employed in connection with a computer system having a memory, an operating system, and a computer application instantiated in a work space in the memory as managed by the operating system, the application including a plurality of application processes running in the work space, the application monitor monitoring whether each of the plurality of application processes is in fact running and automatically attempting to remedy an occurrence where any of the plurality of application processes is not in fact running.

22. The application monitor of claim 21 wherein the application monitor is created by the operating system in the work space of the application.

23. The application monitor of claim 21 wherein the operating system instantiates the application by processing a configuration file which includes a sequential list of the plurality of application processes to be run, and wherein the application monitor is run separately from the processing of the configuration file.

24. The application monitor of claim 21 wherein the application monitor periodically checks with the operating system to determine whether each of the plurality of application processes is in fact running.

25. The application monitor of claim 21 wherein if the application monitor finds that any of the plurality of application processes is not in fact running, such application monitor re-starts each non-running application process.

26. The application monitor of claim 25 wherein the re-start is followed by the application monitor checking to determine whether each application process is in fact running.

27. The application monitor of claim 25 wherein the application monitor creates and stores a record of the re-start.

28. The application monitor of claim 25 wherein the application monitor issues an emergency notification if repeated re-starts occur.

29. The application monitor of claim 28 wherein the application monitor issues the emergency notification by way of a member of a group consisting of an electronic mail message, an electronic telephone message, a telephone call to a beeper number, a radio message, and a warning buzzer.

30. The application monitor of claim 21 wherein if the application monitor finds that any of the plurality of application processes is not in fact running, such application monitor shuts down and re-starts the application.

31. The application monitor of claim 30 wherein the re-start is followed by the application monitor checking to determine whether each application process is in fact running.

32. The application monitor of claim 30 wherein the operating system instantiates the application by processing a configuration file which includes an ordered list of the plurality of application processes to be run, and wherein the shut down comprises shutting down each of the plurality of application processes in a reverse order as listed in the configuration file.

33. The application monitor of claim 30 wherein the application monitor creates and stores a record of the re-start.

34. The application monitor of claim 30 wherein the application monitor issues an emergency notification if repeated re-starts occur.

35. The application monitor of claim 34 wherein the application monitor issues the emergency notification by way of a member of a group consisting of an electronic mail message, an electronic telephone message, a telephone call to a beeper number, a radio message, and a warning buzzer.

36. The application monitor of claim 21 wherein the operating system instantiates the application by processing a configuration file which includes an ordered list of the plurality of application processes to be run, and wherein if the application monitor finds that any of the plurality of application processes is not in fact running, such application monitor shuts down each of the plurality of application processes in a reverse order as listed in the configuration file until a point where all of the non-running application processes would have been shut down, and then re-starts each of the plurality of application processes from the point in a forward order as listed in the configuration file.

37. The application monitor of claim 36 wherein the re-start is followed by the application monitor checking to determine whether each application process is in fact running.

38. The application monitor of claim 36 wherein the application monitor creates and stores a record of the re-start.

39. The application monitor of claim 36 wherein the application monitor issues an emergency notification if repeated re-starts occur.

40. The application monitor of claim 39 wherein the application monitor issues the emergency notification by way of a member of a group consisting of an electronic mail message, an electronic telephone message, a telephone call to a beeper number, a radio message, and a warning buzzer.

41. In a computer system having a memory, an operating system, and a computer application instantiated in a work space in the memory as managed by the operating system, the application including a plurality of application processes running in the work space, a method comprising:

monitoring whether each of the plurality of application processes is in fact running; and automatically attempting to remedy an occurrence where any of the plurality of application processes is not in fact running.

42. The method of claim 41 comprising creating an application monitor in the work space of the application to perform the monitoring and attempting steps.

43. The method of claim 41 comprising periodically checking with the operating system to determine whether each of the plurality of application processes is in fact running.

44. The method of claim 41 comprising, if any of the plurality of application processes is not in fact running, re-starting each non-running application process.

45. The method of claim 44 comprising checking after the re-start to determine whether each application process is in fact running.

46. The method of claim 44 comprising creating and storing a record of the re-start.

47. The method of claim 44 comprising issuing an emergency notification if repeated re-starts occur.

48. The method of claim 47 comprising issuing the emergency notification by way of a member of a group consisting of an electronic mail message, an electronic telephone message, a telephone call to a beeper number, a radio message, and a warning buzzer.

49. The method of claim 41 comprising, if any of the plurality of application processes is not in fact running, shutting down and re-starting the application.

50. The method of claim 49 comprising checking after the re-start to determine whether each application process is in fact running.

51. The method of claim 49 wherein the operating system instantiates the application by processing a configuration file which includes an ordered list of the plurality of application processes to be run, the method comprising shutting down each of the plurality of application processes in a reverse order as listed in the configuration file.

52. The method of claim 49 comprising creating and storing a record of the re-start.

53. The method of claim 49 comprising issuing an emergency notification if repeated re-starts occur.

54. The method of claim 53 comprising issuing the emergency notification by way of a member of a group consisting of an electronic mail message, an electronic telephone message, a telephone call to a beeper number, a radio message, and a warning buzzer.

55. The method of claim 41 wherein the operating system instantiates the application by processing a configuration file which includes an ordered list of the plurality of application processes to be run, the method comprising, if any of the plurality of application processes is not in fact running, shutting down each of the plurality of application processes in a reverse order as listed in the configuration file until a point where all of the non-running application processes would have been shut down, and then re-starting each of the plurality of application processes from the point in a forward order as listed in the configuration file.

56. The method of claim 55 comprising checking after the re-start to determine whether each application process is in fact running.

57. The method of claim 55 comprising creating and storing a record of the re-start.

58. The method of claim 55 comprising issuing an emergency notification if repeated re-starts occur.

59. The method of claim 58 comprising issuing the emergency notification by way of a member of a group consisting of an electronic mail message, an electronic telephone message, a telephone call to a beeper number, a radio message, and a warning buzzer.

* * * * *

UNITED STATES PATENT AND TRADEMARK OFFICE
CERTIFICATE OF CORRECTION

PATENT NO.        : 6,732,359 B1
APPLICATION NO. : 09/468446
DATED               : May 4, 2004
INVENTOR(S)      : Mark Kirkpatrick and Darin J. Morrow It is certified that error appears in the above-identified patent and that said Letters Patent is hereby corrected as shown below:

Col. 6, lines 37-45 (Claim 1) should read:
1. A computer system having a memory, an operating system, a computer application instantiated in a work space in the memory as managed by the operating system, the application including a plurality of application processes running in the work space, and an application monitor monitoring whether each of the plurality of application processes is in fact running and automatically attempting to remedy an occurrence where any of the plurality of application processes is not in fact running, wherein the application monitor is aware of each of the plurality of application processes and refers to application process status information as maintained by the operating system to ascertain whether each such application process is in fact running, wherein the operating system instantiates the application by processing a configuration file which includes a sequential list of the plurality of application processes to be run, and wherein the application monitor is aware of each application process listed in the configuration file, and wherein the application process status information maintained by the operating system includes each application process currently running.

Col. 7, lines 58-67 (Claim 21) should read as follows:
21. An application monitor employed in connection with a computer system having a memory, an operating system, and a computer application instantiated in a work space in the memory as managed by the operating system, the application including a plurality of application processes running in the work space, the application monitor monitoring whether each of the plurality of application processes is in fact running and automatically attempting to remedy an occurrence where any of the plurality of application processes is not in fact running, wherein the application monitor is aware of each of the plurality of application processes and refers to application process status information as maintained by the operating system to ascertain whether each such application process is in fact running, wherein the operating system instantiates the application by processing a configuration file which includes a sequential list of the plurality of application processes to be run, and wherein the application monitor is aware of each application process listed in the configuration file, and wherein the application process status information maintained by the operating system includes each application process currently running.

UNITED STATES PATENT AND TRADEMARK OFFICE
CERTIFICATE OF CORRECTION

PATENT NO. : 6,732,359 B1
APPLICATION NO. : 09/468446
DATED : May 4, 2004
INVENTOR(S) : Mark Kirkpatrick and Darin J. Morrow It is certified that error appears in the above-identified patent and that said Letters Patent is hereby corrected as shown below:

Col. 9, lines 19-28 (Claim 41) should read as follows:
41.   In a computer system having a memory, an operating system, and a computer application instantiated in a work space in the memory as managed by the operating system, the application including a plurality of application processes running in the work space, a method comprising:
monitoring whether each of the plurality of application processes is in fact running; and
automatically attempting to remedy an occurrence where any of the plurality of application processes is not in fact running,
the method comprising referring to application process status information as maintained by the operating system to ascertain whether each such application process is in fact running,
wherein the operating system instantiates the application by processing a configuration file which includes a sequential list of the plurality of application processes to be run, the method comprising comparing the application process status information and each application process listed in the configuration file.

Signed and Sealed this

Seventeenth Day of October, 2006

JON W. DUDAS
*Director of the United States Patent and Trademark Office*